US012562643B2

(12) United States Patent
Weigell et al.

(10) Patent No.: US 12,562,643 B2
(45) Date of Patent: Feb. 24, 2026

(54) MODULAR POWER SUPPLY, MODULE DESIGNED THEREFOR, AND POWER SUPPLY METHOD

(71) Applicant: Rohde & Schwarz GmbH & Co. KG, Munich (DE)

(72) Inventors: Philipp Weigell, Baierbrunn (DE); Sascha Kunisch, Haibach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/775,421

(22) Filed: Jul. 17, 2024

(65) Prior Publication Data

US 2025/0202355 A1      Jun. 19, 2025

(30) Foreign Application Priority Data

Dec. 18, 2023    (EP) ..................................... 23217457

(51) Int. Cl.
    *H02M 1/00*        (2007.01)
    *H02M 1/32*        (2007.01)
    *H02M 3/156*       (2006.01)
(52) U.S. Cl.
    CPC ........... *H02M 3/156* (2013.01); *H02M 1/007* (2021.05); *H02M 1/32* (2013.01)
(58) Field of Classification Search
    CPC . G06F 1/26; G06F 1/3296; G06F 1/28; G06F 1/3287; G06F 1/32; H02M 3/155; H02M 3/1584; H02M 1/0003; H02M 1/007; H02M 1/0032; H02M 1/0043; H02M 1/36; H02M 1/00; H02M 3/158; Y02B 70/10

USPC .......... 307/11, 38, 31; 323/282, 271; 363/65
See application file for complete search history.

(56) References Cited

U.S. PATENT DOCUMENTS

| | | | |
|---|---|---|---|
| 10,125,706 B2 | 11/2018 | Viele et al. | |
| 2017/0054368 A1 | 2/2017 | Tschirhart | |
| 2022/0091661 A1 | 3/2022 | McAfee et al. | |
| 2024/0088791 A1 * | 3/2024 | Hosotani ............. | H02M 1/0009 |

FOREIGN PATENT DOCUMENTS

WO        2022/158388 A1      7/2022

OTHER PUBLICATIONS

Extended European Search Report issued in EP 23217457.3-1002 by the European Patent Office on Jun. 4, 2024.

* cited by examiner

*Primary Examiner* — Elim Ortiz
(74) *Attorney, Agent, or Firm* — Studebaker Brackett PLLC

(57)        ABSTRACT

A modular power supply comprises a primary power supply module comprising a primary control unit and a primary feedback control loop for an electrical characteristic of the electrical power supplied at its output terminals, and at least one secondary power supply module, each of which comprising a respective independent secondary feedback control loop for an electrical characteristic of the electrical power supplied at the respective output terminals, and being connected with the primary control unit via a communication interface, the primary control unit exemplarily controlling the primary power supply module and the at least one secondary power supply module, the output power of the primary power supply module and the at least one secondary power supply module being combined.

15 Claims, 2 Drawing Sheets

Figure 1:
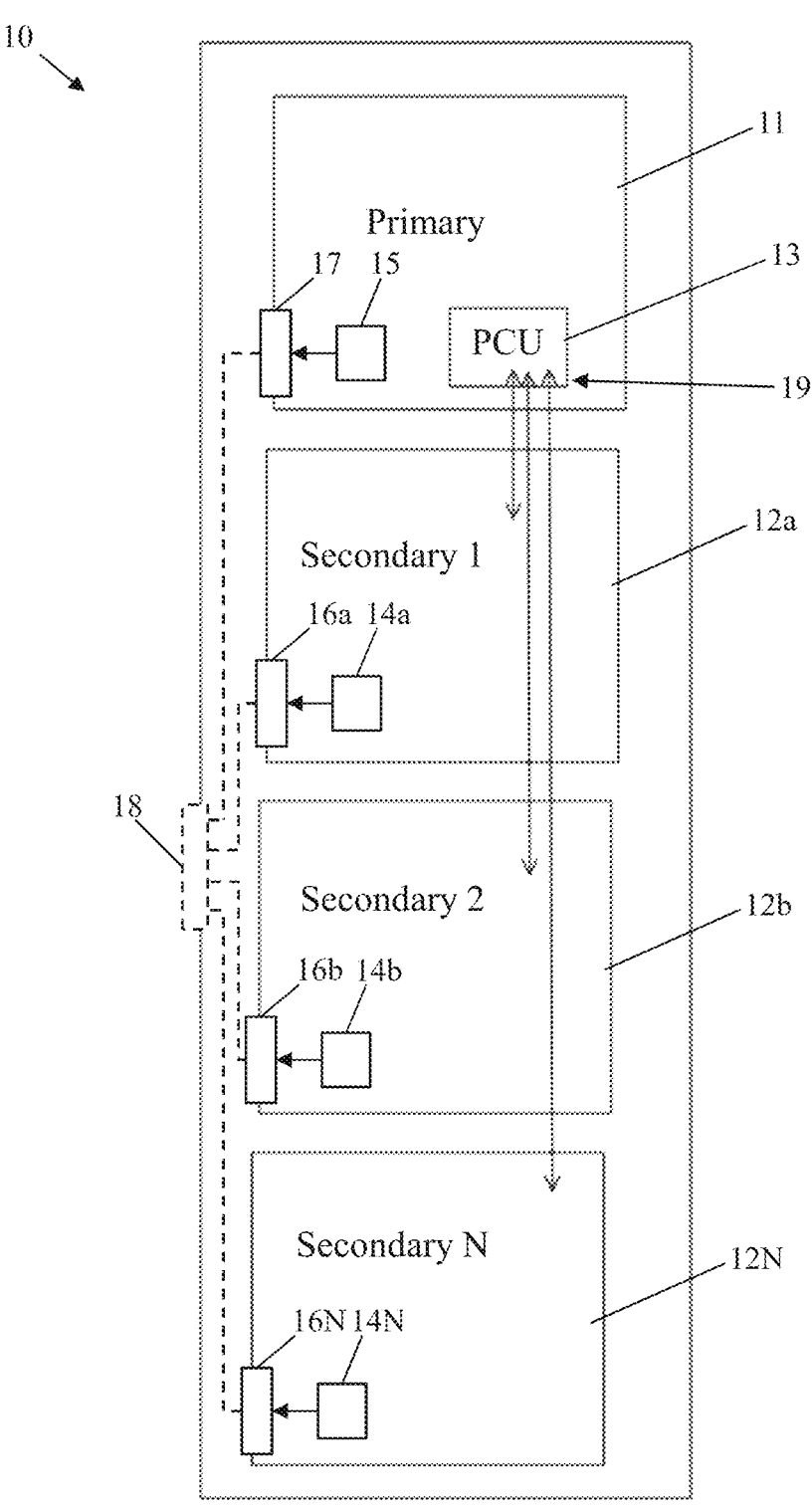

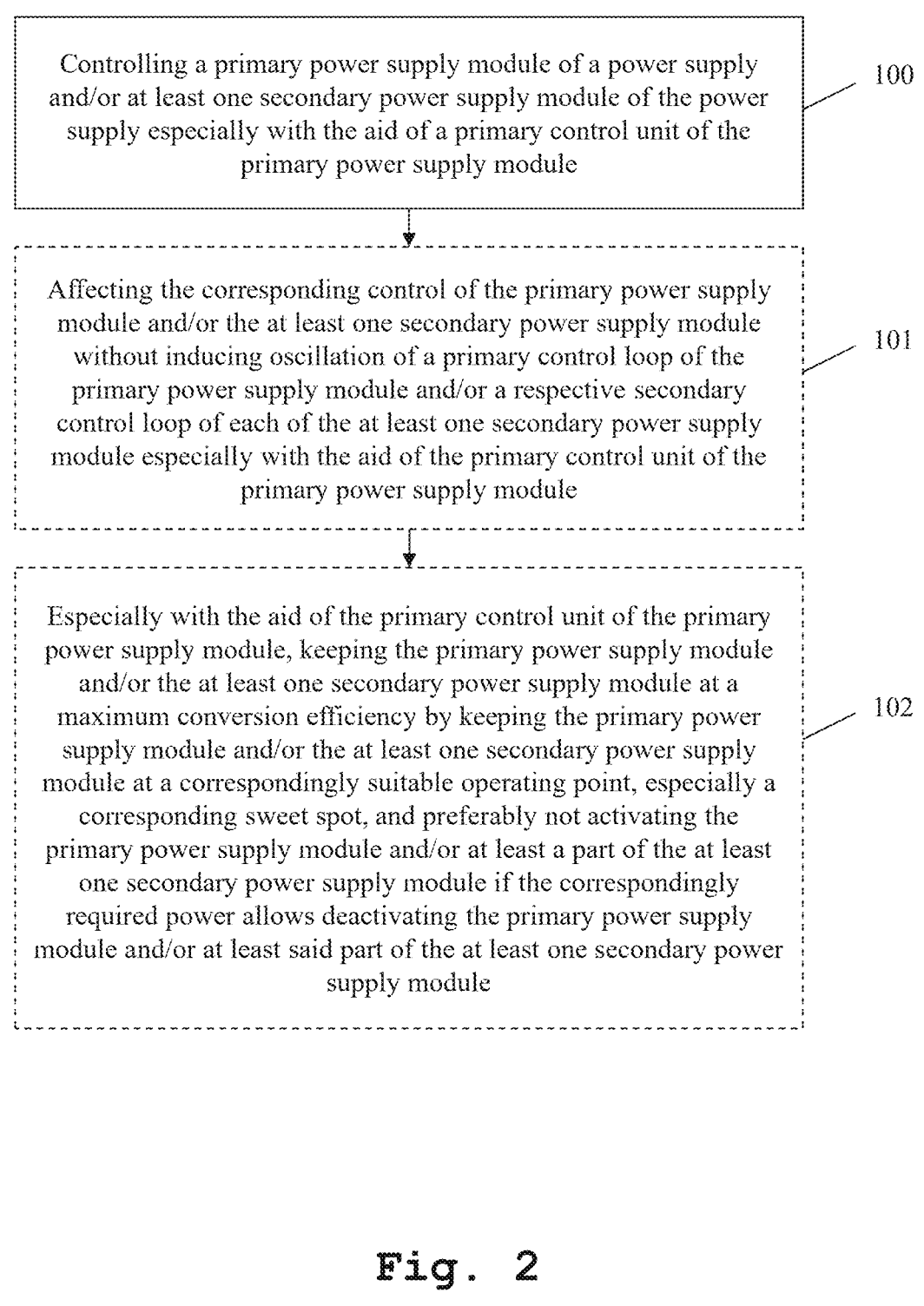

Controlling a primary power supply module of a power supply and/or at least one secondary power supply module of the power supply especially with the aid of a primary control unit of the primary power supply module ⟋ 100

Affecting the corresponding control of the primary power supply module and/or the at least one secondary power supply module without inducing oscillation of a primary control loop of the primary power supply module and/or a respective secondary control loop of each of the at least one secondary power supply module especially with the aid of the primary control unit of the primary power supply module ⟋ 101

Especially with the aid of the primary control unit of the primary power supply module, keeping the primary power supply module and/or the at least one secondary power supply module at a maximum conversion efficiency by keeping the primary power supply module and/or the at least one secondary power supply module at a correspondingly suitable operating point, especially a corresponding sweet spot, and preferably not activating the primary power supply module and/or at least a part of the at least one secondary power supply module if the correspondingly required power allows deactivating the primary power supply module and/or at least said part of the at least one secondary power supply module ⟋ 102

Fig. 2

MODULAR POWER SUPPLY, MODULE DESIGNED THEREFOR, AND POWER SUPPLY METHOD

The invention relates to a modular power supply, a primary power supply module designed for such a power supply, and a power supply method.

Generally, in times of an increasing number of applications requiring to be supplied with electrical power with different demands, there is a growing need of a modular power supply, a primary power supply module designed for such a power supply, and a power supply method in order to supply such applications in a scalable and flexible manner, thereby ensuring a high cost-efficiency.

US 2014/0121939 A1 relates to a boost power supply constructed of a number of smaller switching power supplies, each switching power supply providing a respective portion of a combined output current provided by the boost power supply to a load. A different respective control signal is provided to each switching power supply to regulate the respective portion of the combined output current provided by the switching power supply. Each different respective control signal is provided to the corresponding switching power supply out of phase with respect to each other different respective control signal to prevent the combined output current from exceeding a specified threshold current value. Disadvantageously, such a configuration of said boost power supply leads to a limited scalability, and thus also a confined flexibility, thereby compromising cost-efficiency.

Accordingly, there is the object to provide a modular power supply, a primary power supply module designed for such a power supply, and a power supply method in order to allow for supplying power in a scalable and flexible manner, thereby ensuring a particularly high cost-efficiency.

This object is solved by the features of the first independent claim for a modular power supply, the features of the second independent claim for a primary power supply module designed for such a power supply, and the features of the third independent claim for a power supply method. The dependent claims contain further developments.

According to a first aspect of the invention, a modular power supply is provided. Said modular power supply comprises a primary power supply module comprising a primary control unit and a primary feedback control loop for an electrical characteristic of the electrical power supplied at its output terminals, and at least one secondary power supply module, each of which comprising a respective independent secondary feedback for control loop an electrical characteristic of the electrical power supplied at the respective output terminals, and being connected with the primary control unit via a communication interface. In this context, the primary control unit is configured to control the primary power supply module and the at least one secondary power supply module, the output power of each of the primary power supply module and the at least one secondary power supply module being combined. In addition to this or as an alternative, the primary control unit is adapted to monitor, via the communication interface, at least one operation parameter of each secondary power supply module reflecting the conversion efficiency of the respective secondary power supply module, issue, via the communication signal and as a function of the respective monitored operation parameter a signal, set the operating point of at least one secondary feedback control loop, activate or deactivate at least one secondary power supply module.

Advantageously, power can be supplied in a scalable and flexible manner, thereby ensuring a particularly high cost-efficiency.

According to an implementation form of the first aspect of the invention, the primary power supply module comprises a primary single or multi-phase switch mode power supply especially comprising the primary control unit.

Advantageously, for instance, several modules can efficiently be combined in a serial and/or parallel manner especially to achieve required output voltage, current, and power.

According to a further implementation form of the first aspect of the invention, the primary control unit comprises or is at least one of a processing unit, a central processing unit, a digital signal processor, a field-programmable gate array, or any combination thereof.

Advantageously, for example, complexity can be reduced, thereby further increasing cost-efficiency.

According to a further implementation form of the first aspect of the invention, the at least one secondary power supply module comprises a respective secondary single or multi-phase switch mode power supply especially comprising at least one of a processing unit, a central processing unit, a digital signal processor, a field-programmable gate array, or any combination thereof. Advantageously, for instance, the primary power supply module can efficiently and reliably ensure that the respective switch mode controllers as well as the respective control loops for voltage and current are synchronized especially to ensure a stable performance during all load conditions.

According to a further implementation form of the first aspect of the invention, the primary control loop comprises or is a voltage-controlled control loop or a current-controlled loop. In addition to this or as an alternative, the respective secondary control loop comprises or is a voltage-controlled control loop or a current-controlled loop. Advantageously, for example, simplicity can be increased, which leads to an increased cost-efficiency.

According to a further implementation form of the first for inducing aspect of the invention, preventing oscillation of the primary control loop and/or the respective secondary control loop, the primary control unit is configured to optimize corresponding set-values of voltage and/or current for the primary power supply module and/or the at least one secondary power supply module. Advantageously, for instance, accuracy and reliability can be increased in a cost-efficient manner.

According to a further implementation form of the first aspect of the invention, for preventing inducing oscillation of the primary control loop, the primary control unit is configured to optimize corresponding switch mode parameters, especially phase and/or phase angle and/or duty-cycle, with respect to the primary single or multi-phase switch mode power supply. Advantageously, for example, inaccuracies and potential unreliability can be reduced in a cost-efficient manner, which can analogously apply for the following implementation form.

According to a further implementation form of the first aspect of the invention, for preventing inducing oscillation of the respective secondary control loop, the primary control unit configured to is optimize corresponding switch mode parameters, especially phase and/or phase angle and/or duty-cycle, with respect to the respective secondary single or multi-phase switch mode power supply.

According to a further implementation form of the first aspect of the invention, the primary control unit comprises a time domain and/or frequency domain input. In addition to this or as an alternative, the primary control unit is configured to detect and/or to minimize oscillations with respect to the primary control loop and/or the respective secondary control loop especially based on the time domain and/or frequency domain input. Advantageously, for instance, complexity can be reduced, thereby increasing cost-efficiency.

According to a further implementation form of the first aspect of the invention, the primary control unit is configured to distribute power between the primary power supply module and/or the at least one secondary power supply module. In addition to this or as an alternative, each of the primary power supply module and/or the at least one secondary power supply module is configured to cover a partial load range especially with respect to a load supplied by the power supply. Advantageously, for example, flexibility can efficiently be increased.

According to a further implementation form of the first aspect of the invention, the primary power supply module and/or the power supply comprises a combined power output. In this context, the combined power output is configured to combine respective power outputs of the primary power supply module and the at least one secondary power supply module. Advantageously, for instance, a desired voltage or current, respectively, can efficiently and accurately be adjusted.

According to a further implementation form of the first aspect of the invention, the primary power supply module and/or the power supply comprises a general control loop for controlling the combined power output. In this context, the primary control unit is especially configured to control the general control loop. Advantageously, for example, accuracy can further be increased in a cost-efficient manner.

According to a second aspect of the invention, a primary power supply module designed for a power supply according to the first aspect of the invention or any of its implementation forms, respectively, is provided.

Advantageously, power can be supplied in a scalable and flexible manner, thereby ensuring a particularly high cost-efficiency.

According to a third aspect of the invention, a power supply method is provided. Said power supply method comprises the steps of controlling a primary power supply module of a power supply and/or at least one secondary power supply module of the power supply especially with the aid of a primary control unit of the primary power supply module, affecting the corresponding control of the primary power supply module and/or the at least one secondary power supply module without inducing oscillation of a primary control loop of the primary power supply module and/or a respective secondary control loop of each of the at least one secondary power supply module especially with the aid of the primary control unit of the primary power supply module, and/or especially with the aid of the primary control unit of the primary power supply module, keeping the primary power supply module and/or the at least one secondary power supply module at a maximum conversion efficiency by keeping the primary power supply module and/or the at least one secondary power supply module at a correspondingly suitable operating point, especially a corresponding sweet spot, and preferably not activating the primary power supply module and/or at least a part of the at least one secondary power supply module if the correspondingly required power allows deactivating the primary power supply module and/or at least said part of the at least one secondary power supply module.

Advantageously, power can be supplied in a scalable and flexible manner, thereby ensuring a particularly high cost-efficiency.

According to an implementation form of the third aspect of the invention, the power supply method further comprises the step of especially in the context of preventing inducing oscillation of the primary control loop and/or the respective secondary control loop, optimizing corresponding set-values of voltage and/or current for the primary power supply module and/or the at least one secondary power supply module especially with the aid of the primary control unit of the primary power supply module. Advantageously, for instance, accuracy and reliability can be increased in a cost-efficient manner.

Exemplary embodiments of the invention are now further explained with respect to the drawings by way of example only, and not for limitation. In the drawings:

FIG. 1 shows an exemplary embodiment of the first aspect of the invention in combination with the second aspect of the invention; and FIG. 2 shows a flow chart of an exemplary embodiment of the third aspect of the invention.

With respect to FIG. 1, a block diagram of an exemplary embodiment of modular power supply 10 is illustrated. Said modular power supply 10 comprises a primary power supply module 11 comprising a primary control unit 13 and a primary feedback control loop 15 for an electrical characteristic of the electrical power supplied at its output terminals 17.

In addition to this, the modular power supply 10 comprises at least one secondary power supply module, exemplarily N secondary power supply modules 12a, 12b, . . . , 12N, each of respective independent secondary which comprising a feedback control loop, exemplarily the secondary feedback control loops 14a, 14b, 14N, for an electrical characteristic of the electrical power supplied at the respective output terminals, exemplarily the output terminals 16a, 16b, . . . , 16N, and being connected with the primary control unit 13 via a communication interface 19.

In this context, the primary control unit 13 is configured to control the primary power supply module 11 and the at least one secondary power supply module or each of the secondary power supply modules 12a, 12b, 12N, respectively, the output power of each of the primary power supply module 11 and the at least one secondary power supply modules or the secondary supply modules 12a, 12b, . . . , 12N, respectively, being combined.

It is noted that it might be particularly advantageous if the primary control unit 13 is adapted to monitor, via the communication interface 19, at least one operation parameter of each secondary power supply module, exemplarily each secondary power supply module 12a, 12b, . . . , 12N, reflecting the conversion efficiency of the respective secondary power supply module.

Moreover, especially in this context, the primary control unit 13 may be adapted to issue, via the corresponding communication signal and as a function of the respective monitored operation parameter, a signal.

Additionally or alternatively, the primary control unit 13 may be adapted to set the operating point of at least one secondary feedback control loop of the exemplary secondary feedback control loops 14a, 14b, . . . 14N.

In further addition to this or as a further alternative, the primary control unit 13 may be adapted to activate or deactivate at least one secondary power supply module of the exemplary secondary power supply modules 12a, 12b, . . . , 12N.

With respect to the primary power supply module 11, it is noted that it might be particularly advantageous if the primary power supply module 11 comprises a primary single or multi-phase switch mode power supply especially comprising the primary control unit 13.

With respect to the primary control unit 13, it is noted that it might be particularly advantageous if the primary control unit 13 comprises or is at least one of a processing unit, a central processing unit, a digital signal processor, a field-programmable gate array, or any combination thereof.

With respect to the at least one secondary power supply module or the secondary power supply modules 12a, 12b, . . . , 12N, it is noted that it might be particularly advantageous if at least one or each of the at least one secondary power supply module or the secondary power supply modules 12a, 12b, . . . , 12N comprises a respective secondary single or multi-phase switch mode power supply especially comprising at least one of a processing unit, a central processing unit, a digital signal processor, a field-programmable gate array, or any combination thereof.

Preferably, said processing unit, said central processing unit, said digital signal processor, or said field-programmable gate array, respectively, may be in communication with the primary control unit 13 especially via the communication interface 19.

With respect to the primary control loop 15, it is noted that it might be particularly advantageous if the primary control loop 15 comprises or is a voltage-controlled control loop or a current-controlled loop.

In addition to this or as an alternative, it might be particularly advantageous if at least one or each of the respective secondary control loop or the secondary control loops 14a, 14b, . . . , 14N, respectively, comprises or is a voltage-controlled control loop or a current-controlled loop.

Moreover, especially for preventing inducing oscillation of the primary control loop 15 and/or the respective secondary control loop or at least one or each of the secondary control loops 14a, 14b, . . . , 14N, respectively, the primary control unit 13 may be configured to optimize corresponding set-values of voltage and/or current for the primary power supply module 11 and/or the at least one secondary power supply module or at least one or each of the secondary power supply modules 12a, 12b, . . . , 12N, respectively.

Furthermore, especially for preventing inducing oscillation of the primary control loop 15, the primary control unit 13 may be configured to optimize corresponding switch mode parameters, especially phase and/or phase angle and/or duty-cycle, with respect to the primary single or multi-phase switch mode power supply.

Additionally or alternatively, especially for preventing inducing oscillation of the respective secondary control loop or at least one or each of the secondary control loops 14a, 14b, . . . , 14N, respectively, the primary control unit 13 may be configured to optimize corresponding switch mode parameters, especially phase and/or phase angle and/or duty-cycle, with respect to the respective secondary single or multi-phase switch mode power supply.

Again, with respect to the primary control unit 13, it is noted that it might be particularly advantageous if the primary control unit 13 comprises a time domain and/or frequency domain input.

In addition to this or as an alternative, the primary control unit 13 may be configured to detect and/or to minimize oscillations with respect to the primary control loop 15 and/or the respective secondary control loop or at least one or each of the secondary control loops 14a, 14b, . . . , 14N, respectively, especially based on the time domain and/or frequency domain input.

Further additionally or further alternatively, the primary control unit 13 may be configured to distribute power between the primary power supply module 11 and/or the at least one secondary power supply module or at least one or each of the secondary power supply modules 12a, 12b, . . . , 12N, respectively.

In further addition to this or as a further alternative, each of the primary power supply module and/or the at least one secondary power supply module, exemplarily the secondary power supply modules 12a, 12b, . . . , 12N, is configured to cover a partial load range especially with respect to a load supplied by the power supply 10.

It is noted that it might be particularly advantageous if the primary power supply module 11 and/or the power supply 10 comprises a combined power output 18 being configured to combine respective power outputs of the primary power supply module 11 and the at least one secondary power supply module or at least one or each of the secondary power supply modules 12a, 12b, . . . , 12N, respectively.

As it can be seen from FIG. 1, in this exemplary case, the modular power supply 10 comprises said combined power output 18 for combining the respective output terminals, exemplarily the output terminals 17, 16a, 16b, . . . , 16N, of the primary power supply module 11 and the at least one secondary power supply module or at least one or each of the secondary power supply modules 12a, 12b, . . . , 12N, respectively.

Especially in the context of the combined power output 18, it is noted that it might be particularly advantageous if the primary power supply module 11 and/or the power supply 10 comprises a general control loop for controlling the combined power output 18. Preferably, the primary control unit 13 may be configured to control said general control loop.

For the sake of completeness, before an exemplary embodiment of the third aspect of the invention is explained in the light of FIG. 2, it is further noted that FIG. 1 does not only illustrate an exemplary embodiment of the first aspect of the invention in the form of the modular power supply 10 but also an exemplary embodiment of the second aspect of the invention in the form of the primary power supply module 11.

Finally, in accordance with FIG. 2 showing a flow chart of an exemplary embodiment of the power supply method, a first step 100 comprises controlling a primary power supply module of a power supply, such as the above-mentioned primary power supply module 11 of the power supply 10 of according to FIG. 1, and/or at least one secondary power supply module, such as the above-mentioned secondary power supply modules 12a, 12b, . . . , 12N, of the power supply especially with the aid of a primary control unit, such as the above-mentioned primary control unit 13, of the primary power supply module.

Furthermore, a step 101 may comprise affecting the corresponding control of the primary power supply module and/or the at least one secondary power supply module without inducing oscillation of a primary control loop, such as the above-mentioned primary control loop 15, of the primary power supply module and/or a respective secondary control loop, such as the above-mentioned secondary control loops 14a, 14b, . . . , 14N, of each of the at least one secondary power supply module especially with the aid of the primary control unit of the primary power supply module.

7

In addition to this or as an alternative, a step 102 may comprise especially with the aid of the primary control unit of the primary power supply module, keeping the primary power supply module and/or the at least one secondary power supply module at a maximum conversion efficiency by keeping the primary power supply module and/or the at least one secondary power supply module at a correspondingly suitable operating point, especially a corresponding sweet spot, and preferably not activating the primary power supply module and/or at least a part of the at least one secondary power supply module if the correspondingly required power allows deactivating the primary power supply module and/or at least said part of the at least one secondary power supply module.

It is noted that it might be particularly advantageous if the power supply method further comprises the step of, especially in the context of preventing inducing oscillation of the primary control loop and/or the respective secondary control loop, optimizing corresponding set-values of voltage and/or current for the primary power supply module and/or the at least one secondary power supply module especially with the aid of the primary control unit of the primary power supply module.

It is further noted that the power supply method may comprise the step of detecting and/or to minimizing oscillations with respect to the primary control loop and/or the respective secondary control loop especially with the aid of the primary control unit preferably based on a time domain and/or frequency domain input of the primary control unit.

Furthermore, it might be particularly advantageous if the power supply method comprises the step of distributing power between the primary power supply module and/or the at least one secondary power supply module especially with the aid of the primary control unit.

In addition to this or as an alternative, the power supply method may comprise the step of configuring each of the primary power supply module and/or the at least one secondary power supply module to cover a partial load range especially with respect to a load supplied by the corresponding power supply such as the modular power supply according to FIG. 1.

Moreover, it might be particularly advantageous if the power supply method comprises the step of combining respective power outputs of the primary power supply module and the at least one secondary power supply module especially with the aid of a combined power output preferably of the primary power supply module and/or the power supply or the modular power supply, respectively.

Especially in this context, the power supply method may comprise the step of controlling the combined power output especially with the aid of a general control loop preferably of the primary power supply module and/or the power supply or the modular power supply, respectively.

It is further noted that it might be particularly advantageous if the power supply method comprises the step of controlling the general control loop especially with the aid of the primary control unit.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A modular power supply comprising:
a primary power supply module comprising a primary control unit and a primary feedback control loop for an electrical characteristic of the electrical power supplied at its output terminals, and
at least one secondary power supply module, each one secondary power supply module comprising a respective independent secondary feedback control loop for an electrical characteristic of the electrical power supplied at the respective output terminals, and being connected with the primary control unit via a communication interface,
wherein the primary control unit is configured to control the primary power supply module and the at least one secondary power supply module,
the output power of each of the primary power supply module and the at least one secondary power supply module being combined,
wherein the primary control unit is adapted to:
monitor, via the communication interface, at least one operation parameter of each secondary power supply module reflecting a conversion efficiency of the respective secondary power supply module,
issue, via a communication signal and as a function of the respective monitored operation parameter a signal,
set an operating point of at least one secondary feedback control loop, and
activate or deactivate at least one secondary power supply module,
wherein the primary control unit comprises a frequency domain input, and
wherein the primary control unit is configured to detect or to minimize oscillations with respect to the primary control loop or the respective secondary control loop based on the frequency domain input.

2. The power supply according to claim 1, wherein the primary power supply module comprises a primary single or multi-phase switch mode power supply comprising the primary control unit.

3. The power supply according to claim 1, wherein the primary control unit comprises or is at least one of a processing unit, a central processing unit, a digital signal processor, a field-programmable gate array, or any combination thereof.

4. The power supply according to claim 1, wherein the at least one secondary power supply module comprises a respective secondary single or multi-phase switch mode power supply comprising at least one of a processing unit, a central processing unit, a digital signal processor, a field-programmable gate array, or any combination thereof.

5. The power supply according to claim 1, wherein the primary control loop comprises or is a voltage-controlled control loop or a current-controlled loop, or wherein the respective secondary control loop comprises or is a voltage-controlled control loop or a current-controlled loop.

6. The power supply according to claim 1, wherein, for preventing inducing oscillation of the primary control loop or the respective secondary control loop, the primary control unit is configured to optimize corresponding set-values of voltage or current for the primary power supply module or the at least one secondary power supply module.

7. The power supply according to claim 2, wherein, for preventing inducing oscillation of the primary control loop, the primary control unit is configured to optimize corresponding switch mode parameters, phase or phase angle or duty-cycle, with respect to the primary single or multi-phase switch mode power supply.

8. The power supply according to claim 4, wherein, for preventing inducing oscillation of the respective secondary control loop, the primary control unit is configured to optimize corresponding switch mode parameters, phase or phase angle or duty-cycle, with respect to the respective secondary single or multi-phase switch mode power supply.

9. The power supply according to claim 1, wherein the primary control unit comprises a time domain input, or wherein the primary control unit is configured to detect or to minimize oscillations with respect to the primary control loop or the respective secondary control loop based on the time domain input.

10. The power supply according to claim 1, wherein the primary control unit is configured to distribute power between the primary power supply module or the at least one secondary power supply module, or wherein each of the primary power supply module or the at least one secondary power supply module is configured to cover a partial load range with respect to a load supplied by the power supply.

11. The power supply according to claim 1, wherein the primary power supply module or the power supply comprises a combined power output, wherein the combined power output is configured to combine respective power outputs of the primary power supply module and the at least one secondary power supply module.

12. The power supply according to claim 11, wherein the primary power supply module or the power supply comprises a general control loop for controlling the combined power output, wherein the primary control unit is configured to control the general control loop.

13. A primary power supply module designed for a power supply according to claim 1.

14. A power supply method comprising the steps of:

controlling a primary power supply module of a power supply or at least one secondary power supply module of the power supply with the aid of a primary control unit of the primary power supply module, wherein the primary control unit comprises a frequency domain unit, affecting the corresponding control of the primary power supply module or the at least one secondary power supply module without inducing oscillation of a primary control loop of the primary power supply module or a respective secondary control loop of each of the at least one secondary power supply module with the aid of the primary control unit of the primary power supply module, and/or with the aid of the primary control unit of the primary power supply module, keeping the primary power supply module or the at least one secondary power supply module at a maximum conversion efficiency by keeping the primary power supply module or the at least one secondary power supply module at a correspondingly suitable operating point, a corresponding sweet spot, and not activating the primary power supply module or at least a part of the at least one secondary power supply module if the correspondingly required power allows deactivating the primary power supply module or at least said part of the at least one secondary power supply module, and with the aid of the primary control unit, detecting or minimizing oscillations with respect to the primary control loop or the respective secondary control loop based on a frequency domain input.

15. The power supply method according to claim 14, wherein the power supply method further comprises the step of:

in the context of preventing inducing oscillation of the primary control loop or the respective secondary control loop, optimizing corresponding set-values of voltage or current for the primary power supply module or the at least one secondary power supply module with the aid of the primary control unit of the primary power supply module.

* * * * *